United States Patent Office 2,933,434
Patented Apr. 19, 1960

2,933,434

GLUTAMIC ACID SYNTHESIS BY AEROMONAS

Robert C. Good, Northbrook, Ill., assignor to International Minerals & Chemical Corporation, a corporation of New York No Drawing. Application June 27, 1957
Serial No. 668,297

7 Claims. (Cl. 195—30)

This invention is concerned with the synthesis of alpha-amino carboxylic acids, and more particularly with the preparation of L-glutamic acid from alpha-ketoglutaric acid compounds through biological means.

L-glutamic acid is widely used in the form of monosodium L-glutamate as a flavor-intensifying agent for a variety of foods. The material is obtained almost entirely from natural sources, e.g., proteins and sugar beet waste liquors. Numerous attempts have been made over the years to synthesize L-glutamic acid by chemical means, but such processes have uniformly produced the racemic mixture, DL-glutamic acid, which necessitates a difficult and expensive resolution step. The present invention is a method which produces L-glutamic acid directly, starting with alpha-ketoglutaric acid, and employing an incubation or fermentation with a biological catalytic system produced by organisms of the genus Aeromonas as the conversion means.

An object of my invention is to provide an improved process for preparing L-glutamic acid.

Another object is to prepare L-glutamic acid by biological means.

Another object is to convert alpha-ketoglutarate into L-glutamate.

Another object is to provide a commercially practicable method for the biological preparation of L-glutamic acid.

It has now been discovered that L-glutamic acid can readily be prepared from alpha-ketoglutaric acid by fermenting the latter in an ammonia-affording medium with an organism of the Aeromonas genus or with an extract thereof.

In accordance with one embodiment of the present invention, Aeromonad cells are suspended in a suitable aqueous medium containing dissolved alpha-ketoglutarate and ammonia, and the mixture is agitated at about 40° C. in the presence or absence of air until the alpha-ketoglutarate is converted into glutamate. The glutamate product is readily recovered from the treated medium in a known manner—e.g., by filtering off the organisms, concentrating to a dry solids content of about 60 to about 85% by weight, filtering off the precipitated solids, acidifying to around pH 3.2, and crystallizing L-glutamic acid therefrom.

The fermentation is suitably carried out in a medium containing alpha-ketoglutarate as the sole or predominating utilizable carbon source at a concentration between about 0.1 and about 10% by weight, preferably between about 0.4 and about 4%, and at a pH between about 6 and about 9, preferably between about 7 and 8. Either the organisms themselves can be employed or an extract thereof containing the active catalytic material, prepared by mechanical maceration, treatment with ultrasonic waves, or according to other techniques known to the art. The proportion of active cells is not critical, but for best yields and most economical operation, it should lie between about 1 and about 3 parts by weight, dry basis, per part of alpha-ketoglutarate in the medium, or an extract equivalent thereto. For most species of the Aeromonads, the fermentation can satisfactorily be carried out at a temperature between about 30 and about 50° C., preferably between about 35 and about 45° C. The conversion will ordinarily reach a maximum in a period of about 5 to about 25 hours, at which point the fermentation is preferably terminated.

The Aeromonads are gas forming, non-spore-forming, gram-negative, falcutative aerobic rods, occurring widely in the soil. This group of organisms was proposed as a genus by Kluyver and Van Neil, Zeit. fuer Bakt., II, 94, 369–403 (1936), but the classification of the various species thereof is not well advanced. I have isolated and successfully employed at least four different species of Aeromonads, the organisms differing primarily only in pigmentation. Cultures of the said species have been deposited with the American Type Culture Collection, 2112 M Street N.W., Washington 7, D.C., under accession numbers ATCC 13560–13563, inclusive.

The medium for the conversion step of my process suitably contains water, a nitrogen source, alpha-ketoglutarate, active Aeromonad organisms, and optionally phosphate and a metallic ion enzyme activator. Such a medium may have the following composition:

| | Vol. percent |
|---|---|
| Alpha-ketoglutaric acid solution, 2.5% | 32 |
| 1 M $(NH_4)_2HPO_4$, pH 7.5 | 10 |
| $10^{-3}$ M $MnSO_4 \cdot 7H_2O$ | 6 |
| 0.05 M phosphate buffer, pH 7.5 | 12 |
| Aeromonad inoculum | 40 |

The inoculum may suitably contain around 25 to 50 mg./ml. of cells, dry weight, and the conversion medium contains around 5 to 10 mg./ml.

The nitrogen and the phosphate may conveniently be added in the form of ammonium phosphate. Alternatively, the phosphate may be added in the form of phosphoric acid or another phosphate salt and the nitrogen in the form of urea, ammonia, or another ammonium salt. For example, the phosphate may be added in the form of an alkali-metal phosphate such as sodium phosphate, and the nitrogen may be added in the form of ammonium chloride, ammonium sulfate, ammonium hydroxide, urea, or the like. The concentration of the nitrogen source in the medium should lie between about 100 and about 1000 micrograms per milliliter, calculated as $NH_4$, and preferably between about 200 and about 400 micrograms per milliliter, varying directly with the alpha-ketoglutarate concentration; and the concentration of phosphate may suitably be up to about 500 micrograms per milliliter, calculated as $PO_4$, preferably between about 10 and about 200 micrograms per milliliter.

The fermentation medium may optionally and advantageously contain a metallic ion enzyme activator. Various salts of bivalent metals may be used; for example, the simple salts of cobalt, zinc, magnesium, and ferrous iron. Manganous sulfate is a preferred activator. The activator, when used, is desirably present in a molar concentration between about $10^{-6}$ and about $10^{-2}$, based upon the total fermentation medium, preferably between about $10^{-4}$ and about $10^{-2}$.

The following specific examples will more clearly illustrate my invention:

*Example 1*

An Aeromonas isolate from soil, which I have designated as strain H–369, IMC B–4 (and which the American Type Culture Collection has designated as ATCC 13563), was grown according to the following procedure, The growth medium was prepared from three solutions having the following compositions:

Solution A:
| | |
|---|---|
| $KH_2PO_4$ | g__ 6.805 |
| $Na_2HPO_4 \cdot 7H_2O$ | g__ 13.41 |
| Water | ml__ 790 |

Solution B:
| | |
|---|---|
| $NH_4Cl$ | g__ 30 |
| Yeast extract | mg__ 50 |
| $MgSO_4 \cdot 7H_2O$ | g__ 20 |
| $CaCl_2$ | mg__ 100 |
| $FeSO_4 \cdot 7H_2O$ | mg__ 5 |
| Water | ml__ 100 |

Solution C: Aq. 2.85% DL-alpha-hydroxyglutaric acid solution, pH 6.7 _____ ml__ 200

All of the solutions were autoclaved. Solutions A and C were mixed with 10 ml. of solution B, yielding a mixture which I have designated for convenience as "S-2 medium." The completed medium was inoculated with 1% by volume of a 24-hour culture of strain H-369, and was then incubated 12 hours at 30° C. One hour before harvesting, an additional 50-ml. portion of Solution C was added. At the end of the incubation, the cells were separated by centrifuging, washed on the centrifuge with water and phosphate buffer, then resuspended in phosphate buffer at pH 6.7. The suspension contained 26.25 mg. of cells, dry weight, per milliliter. The suspension was stored in a refrigerator for 3 hours, then incorporated in a medium having the following composition:

| | Ml. |
|---|---|
| Aqueous 2.5% alpha-ketoglutarate solution, pH 8.0 | 4.0 |
| 1 M $(NH_4)_2HPO_4$ solution | 1.25 |
| $MnSO_4$ solution, $10^{-3}$ M | 0.75 |
| Phosphate buffer, 0.05 M, pH 7.5 | 1.5 |
| H-369 cell suspension | 5.0 |
| | 12.5 |

The completed medium, containing 10.5 mg. of dry cells per milliliter and 8.00 mg. of alpha-ketoglutarate per milliliter, was placed in a 50-milliliter flask, stoppered lightly, and shaken in a water bath at 37° C. Samples were removed from time to time and analyzed for glutamic acid content. The results were as follows:

| Incubation Time, hr. | pH | L-Glutamic Acid | | Conversion, percent |
|---|---|---|---|---|
| | | Found, mg./ml. | Synthesized, mg./ml. | |
| 0 | 7.0 | 0.09 | | |
| 2 | | 1.42 | 1.33 | 16.6 |
| 19 | | 3.07 | 2.98 | 37.3 |
| 26 | 6.9 | 1.83 | 1.74 | 21.8 |

*Example 2*

S-2M medium (5 liters) containing 15 g. of glucose instead of alpha-hydroxyglutarate was inoculated with 100 ml. of a 24-hour culture of Aeromonas H-369 and incubated at 30° C. with an air flow of 9 liters/min. through the liquid phase. At the end of 16.5 hours, 30 ml. of an aqueous 2.85% solution of DL-alpha-hydroxyglutaric acid were added. Fifteen minutes later, 100 ml. of the hydroxyglutaric acid solution and 0.5 wt. percent of yeast extract were added. At the end of 21 hours (total time), the cells were harvested, washed on a centrifuge with water and phosphate buffer, and resuspended in phosphate buffer at pH 6.7. The suspension measured approximately 120 ml. and contained 47.5 mg. of cells, dry weight, per milliliter.

Two portions of a medium having the following composition were prepared:

| | |
|---|---|
| Aq. 2.5% alpha-ketoglutarate solution, pH 8.0 | ml__ 8.0 |
| 1 M $(NH_4)_2HPO_4$ solution, pH 8.0 | ml__ 2.5 |
| $MnSO_4$ solution, $10^{-3}$ M | ml__ 1.5 |
| Phosphate buffer, 0.05 M, pH 8.0 | ml__ 3.0 |
| Cell suspension | As indicated below |

Each portion was placed in a 50-milliliter flask, stoppered lightly, and shaken for 46 hours in a water bath at 44° C. Samples were withdrawn from time to time and analyzed, with the following results:

| Inoculum vol., ml. | Substrate Conc'n, mg./ml. | Cell Conc'n, mg./ml. | Incubation Time, hr. | pH | L-Glutamic Acid | | Conversion, percent |
|---|---|---|---|---|---|---|---|
| | | | | | Found, mg./ml. | Synthesized, mg./ml. | |
| 10 | 8.0 | 19 | 0 | 7.5 | 0.10 | | |
| | | | 5 | 7.2 | 1.14 | 1.04 | 13.0 |
| | | | 18 | 7.3 | 1.86 | 1.76 | 22.0 |
| | | | 24 | 7.4 | 1.94 | 1.84 | 23.0 |
| | | | 46 | 7.4 | 2.09 | 1.99 | 24.9 |
| 20 | 6.25 | 29.7 | 0 | 7.3 | 0.11 | | |
| | | | 5 | 7.0 | 1.73 | 1.62 | 25.9 |
| | | | 18 | 7.1 | 2.85 | 2.74 | 43.8 |
| | | | 24 | 7.2 | 3.12 | 3.01 | 48.2 |
| | | | 46 | 7.2 | 3.32 | 3.21 | 51.4 |

The term "alpha-ketoglutarate" as used herein is intended to refer to alpha-ketoglutaric acid and to the ammonium, alkali-metal, and alkaline-earth metal salts thereof. Similarly, "glutamate" is intended to refer to glutamic acid and to the ammonium, alkali-metal, and alkaline-earth metal salts thereof.

The term "fermentation" as used herein is intended to refer to a process in which organisms are employed to catalyze the conversion of a substrate into one or more desired products.

The foregoing examples are intended only to illustrate and to clarify the invention, and in no respect as a limitation upon the scope thereof. Numerous modifications, equivalents, and alternative procedures, materials, and conditions will be apparent from the foregoing description to those skilled in the art.

In accordance with the foregoing description, I claim as my invention:

1. A process for producing L-glutamic acid which comprises fermenting alpha-ketoglutarate in aqueous admixture with a nitrogen source and a biological catalytic system produced by a microorganism of the genus Aeromonas.

2. The process of claim 1 wherein said fermentation is carried out at a temperature between about 30 and about 50° C.

3. A process for producing L-glutamic acid which comprises fermenting alpha-ketoglutarate and a nitrogen source comprising essentially a substance selected from the group consisting of ammonia, ammonium salts, and urea in aqueous solution in admixture with a microorganism of the genus Aeromonas at a temperature between about 30 and about 50° C.

4. The process of claim 3 wherein said fermentation is carried out at a temperature between about 35 and about 45° C.

5. A process for producing L-glutamic acid which comprises fermenting an aqueous mixture containing alpha-ketoglutarate, an ammonium salt, and microorganisms of the genus Aeromonas at a temperature between about 30 and about 50° C. and a pH between about 6 and about 9 for a period of about 5 to about 25 hours, and recovering L-glutamic acid from the fermentation product.

6. A process for producing L-glutamic acid which comprises fermenting an aqueous mixture containing alpha-ketoglutarate, an ammonium salt, and microorganisms of the genus Aeromonas at a temperature between about 35 and about 45° C. and a pH between about 7 and about 8 for a period of about 5 to about 25 hours, and recovering L-glutamic acid from the fermentation product.

7. A process for producing L-glutamic acid which comprises fermenting an aqueous mixture containing alpha-ketoglutarate, an ammonium salt, phosphate, a metallic ion enzyme activator, and microorganisms of the genus Aeromonas at a temperature between about 30 and about 50° C. and at a pH between about 6 and about 9 for a period of about 5 to about 25 hours, and recovering L-glutamic acid from the fermentation product.

References Cited in the file of this patent
UNITED STATES PATENTS 2,749,279    Smythe et al. _____ June 5, 1956

OTHER REFERENCES

J. Biol. Chem., vol. 187 (1950), pp. 821 to 830.